(12) United States Patent
Cota-Robles et al.

(10) Patent No.: US 8,166,349 B2
(45) Date of Patent: Apr. 24, 2012

(54) COMMUNICATING WITH USB DEVICES AFTER A COMPUTER SYSTEM CRASH

(75) Inventors: Erik Cota-Robles, Mountain View, CA (US); Praveen Vegulla, San Jose, CA (US); Kinshuk Govil, Los Altos, CA (US); Olivier Cremel, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 192 days.

(21) Appl. No.: 12/337,697

(22) Filed: Dec. 18, 2008

(65) Prior Publication Data

US 2010/0161863 A1   Jun. 24, 2010

(51) Int. Cl.
*G06F 11/00* (2006.01)

(52) U.S. Cl. .......................................... 714/45; 709/220

(58) Field of Classification Search ...................... 714/45
See application file for complete search history.

(56) References Cited

U.S. PATENT DOCUMENTS

| | | | | |
|---|---|---|---|---|
| 5,437,047 A * | 7/1995 | Nakamura | ..................... | 709/201 |
| 6,012,103 A * | 1/2000 | Sartore et al. | ..................... | 710/8 |
| 6,202,090 B1 * | 3/2001 | Simone | ......................... | 709/220 |
| 6,263,392 B1 * | 7/2001 | McCauley | ..................... | 710/305 |
| 6,681,348 B1 * | 1/2004 | Vachon | ............................. | 714/45 |
| 6,769,077 B2 * | 7/2004 | Vachon et al. | .................. | 714/43 |
| 6,775,698 B1 * | 8/2004 | Simone | ......................... | 709/221 |
| 7,240,240 B2 * | 7/2007 | Balakrishnan et al. | ......... | 714/15 |
| 7,454,606 B2 * | 11/2008 | Marquiz | ........................... | 713/1 |
| 2002/0078404 A1 * | 6/2002 | Vachon et al. | .................. | 714/38 |
| 2002/0194525 A1 * | 12/2002 | Mathiske et al. | ................. | 714/5 |
| 2005/0210077 A1 * | 9/2005 | Balakrishnan et al. | ........ | 707/200 |
| 2006/0271773 A1 * | 11/2006 | Marquiz | ........................... | 713/1 |
| 2009/0077420 A1 * | 3/2009 | Sunavala et al. | ................ | 714/25 |

* cited by examiner

*Primary Examiner* — Scott Baderman
*Assistant Examiner* — Kamini Patel

(57) ABSTRACT

One embodiment is a method of transferring data from a computer system to a Universal Serial Bus (USB) device after a computer system crash where interrupts are masked, the method comprising: (a) detecting the computer system crash; (b) transferring at least a portion of the data to a USB driver for the USB device; (c) the USB driver transferring the portion of the data to a USB controller driver for a USB controller for the USB device; (d) the USB controller driver causing the USB controller to transfer the portion of the data to the USB device; (e) polling the USB controller to determine whether the data transfer was completed; and (f) if the data transfer was completed, providing a notification to the computer system. Another embodiment is a method of transferring data from a Universal Serial Bus (USB) device to a computer system after a computer system crash where interrupts are masked, the method comprising: (a) detecting the computer system crash; (b) identifying a USB device used to communicate data to the computer system; (c) polling a USB controller for the identified USB device to determine whether new input has been received; (d) if so, obtaining the new input; and (e) transferring the new output to the computer system for further processing.

12 Claims, 4 Drawing Sheets

COMMUNICATING WITH USB DEVICES AFTER A COMPUTER SYSTEM CRASH

TECHNICAL FIELD

One or more embodiments of the invention relate generally to computer systems, and more particularly, to methods for communicating with USB devices after a computer system crash.

BACKGROUND

When a computer system encounters an error that causes the operating system, for example, to cease processing (sometimes referred to as a "crash"), it is desired to record information useful in (a) evaluating and analyzing operations of the computer system, and (b) diagnosing a root cause of the crash. The recorded information is referred to as a core dump, and is typically recorded before the system shuts down—the information in the core dump represents the state of the computer system at the time the crash occurred. In particular, the core dump typically includes contents of all memory locations, along with various registers, accumulators, and the like. Since the information ought to survive system shutdown, it is typically written to a permanent storage medium such as a disk.

In another scenario that commonly arises when a computer system crashes, provision may be made for debugging. To do so, typically, an interface is presented on a display monitor, which monitor may also display crash specific information (e.g., type of error and register contents). In particular, a simple user interface may be presented with support limited to keyboard commands only or a more complex graphical user interface may be presented with support for keyboard, mouse and other input devices. In some cases, a debugging interface may support browsing of system logs, viewing a callstack of a faulting processor, and possibly other processors, binary and/or symbolic inspection and modification of system memory, soft reboot of the system, and possibly other features.

SUMMARY

One or more embodiments of the present invention are a method, machine-readable medium, and a system for communicating with USB devices after a computer system crash. One embodiment is a method of transferring data from a computer system to a Universal Serial Bus (USB) device after a computer system crash where interrupts are masked, the method comprising: (a) detecting the computer system crash; (b) transferring at least a portion of the data to a USB driver for the USB device; (c) the USB driver transferring the portion of the data to a USB controller driver for a USB controller for the USB device; (d) the USB controller driver causing the USB controller to transfer the portion of the data to the USB device; (e) polling the USB controller to determine whether the data transfer was completed; and (f) if the data transfer was completed, providing a notification to the computer system. Another embodiment is a method of transferring data from a Universal Serial Bus (USB) device to a computer system after a computer system crash where interrupts are masked, the method comprising: (a) detecting the computer system crash; (b) identifying a USB device used to communicate data to the computer system; (c) polling a USB controller for the identified USB device to determine whether new input has been received; (d) if so, obtaining the new input; and (e) transferring the new output to the computer system for further processing.

DETAILED DESCRIPTION

Figure 1:
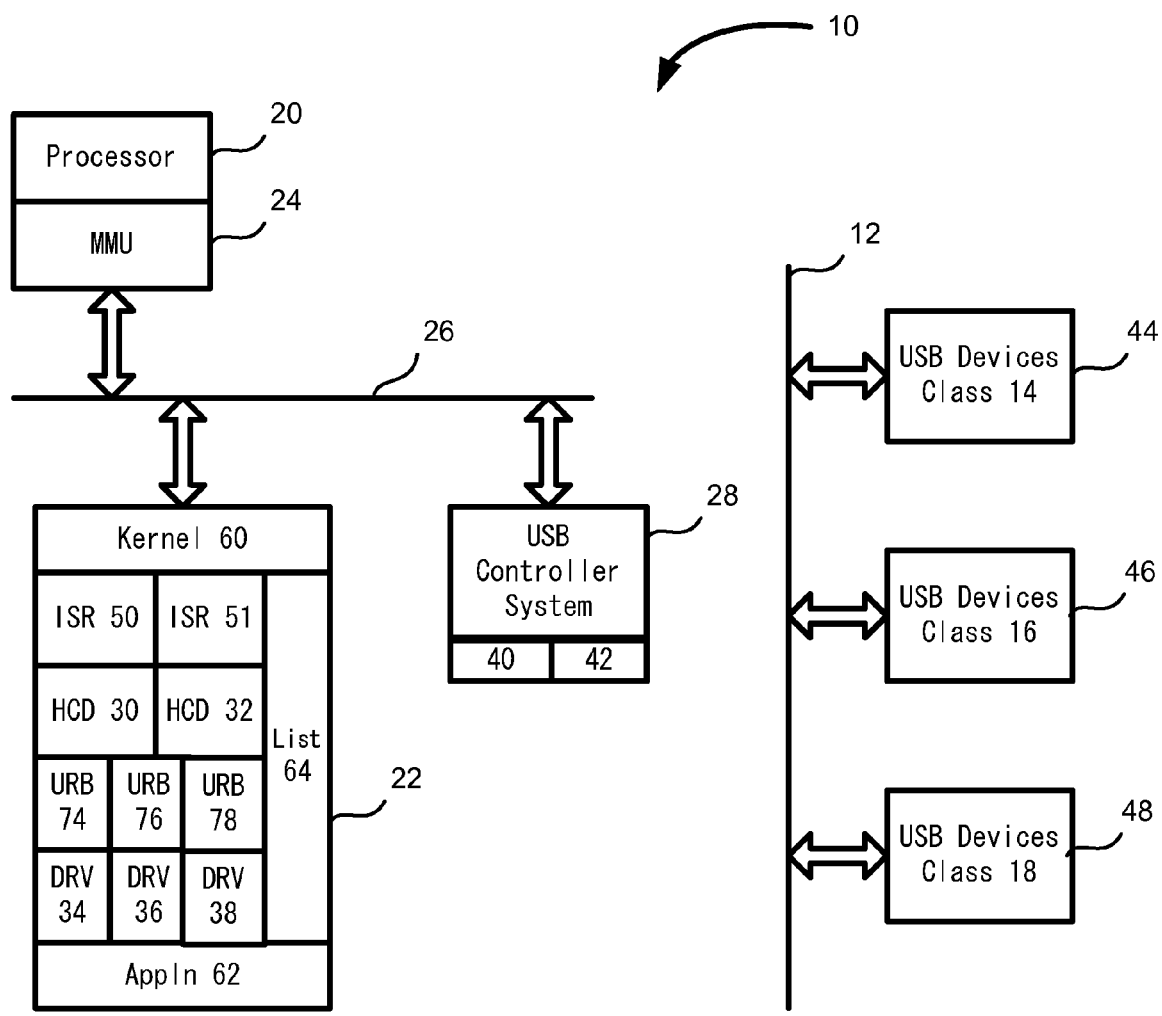
FIG. 1 is a functional block diagram showing a computer system configured to communicate with universal serial bus (USB) devices in accordance with one or more embodiments of the present invention.

FIG. 1 is a functional block diagram showing computer system 10 configured to use universal serial bus (USB) 12 to communicate via USB control system 28 with a plurality of USB devices 44, 46 and 48 of classes 14, 16 and 18, respectively. As shown in FIG. 1, computer system 10 includes processor 20 in data communication with memory 22 through memory management unit (MMU) 24. Specifically, when executing program code, data propagates among processor 20 and other components of computer system 10 over system bus 26 via MMU 24.

As further shown in FIG. 1, USB control system 28 is also in data communication with system bus 26. USB control system 28 is a hardware device that supports, for example, low speed (1.5 Mbit/s) and full speed (12 Mbit/s) data transfers over USB bus 12 as well as an optional high speed data transfer rate of 480 Mbit/s. USB control system 28 includes a plurality of USB controllers, for example, USB controllers 40 and 42, each of which USB controllers 40 and 42 supports one or more of the afore-mentioned data transmission rates. USB controllers 40 and 42 handle communication among computer system 10 and non-overlapping subsets of the USB devices attached to USB bus 12 so that each such USB device is serviced by a single one of USB controllers 40 or 42. USB controllers 40 and 42 transfer data between system bus 26 and USB bus 12 by providing an interface between USB host controller drivers (HCDs) 30 and 32 (resident in memory 22), respectively, and USB bus 12. In particular, USB controllers 40 and 42 process data lists that are constructed in memory 22 by HCDs 30 and 32, respectively, for data transmission over USB bus 12 in accordance with one or more of various frame-based USB bus protocols. For simplicity, details of USB bus topology as well as complicating factors such as split frames and hubs that are well known to those skilled in the art are not included in FIG. 1.

Each attached USB device is configured to communicate with computer system 10 via one of USB controllers 40 and 42. However, an appropriate driver must also be present for each USB device of classes 14, 16 and 18, as well as for any other USB device that is connected to USB bus 12, to perform work for computer system 10. Devices of class 14 are human interface devices (HID) such as a USB mouse or keyboard; for example, USB device 44 may be a USB keyboard. In order for computer system 10 to receive keystrokes from USB device 44, HID class USB driver 34 must be loaded in memory 22 and executing on processor 20 as shown in FIG. 1. Devices of class 16 are mass-storage USB devices that require USB mass storage class USB driver 36 to be loaded in memory 22 and executing on processor 20 as shown in FIG. 1. USB device 46 is such a device; for example, USB device 46 may be a USB flash drive. Devices of class 18 are members of an arbitrary unspecified class or they may be members of no class having a device specific protocol and driver. USB device driver 38 may thus be either another class specific driver or a device specific protocol driver.

Kernel 60, loaded into memory 22, allocates requests among USB devices of classes 14, 16 and 18 and computer system 10. Specifically, application 62, also loaded into memory 22, may be executing on processor 20, and any data transfer between memory 22 and USB devices of classes 14, 16 and 18, referred to as I/O requests, occurs under control of USB device drivers 34, 36 and 38, respectively. Kernel 60 maintains list 64 of available USB devices, which USB devices are detected by kernel 60 when computer system 10 is activated, i.e., booted, using well known techniques or when USB devices of classes 14, 16 and 18 are subsequently attached thereto. An example of kernel 60 is one that is included in an operating system that supports execution of virtual machines on computer system 10, such as an operating system available with a product sold under the trade name ESX Server from VMware, Inc. of Palo Alto, Calif. I/O requests to/from USB devices of classes 14, 16 and 18 are scheduled by kernel 60 to facilitate management of use of processor 20 and memory 22 by the various processes that may be running on computer system 10.

All I/O requests between processor 20 and USB devices 44, 46 and 48 are proxied through one of USB controllers 40 and 42. Kernel 60 interrupt-based programming is used to notify USB HCD 30 and 32 when a data transmission to/from USB devices 44, 46 and 48 has been completed. An interrupt from USB control system 28 causes kernel 60: (a) to suspend and save the state of execution via a context switch; and (b) to begin execution of corresponding interrupt handler 50 or 52 (ISR 50 or 52) included in USB HCDs 30 and 32, respectively. USB HCD 30 or 32 processes the data, and notifies USB device driver 34, 36 or 38 corresponding to the USB device for which the I/O request is applicable. When it is ready to handle the I/O request, kernel 60 effects a context switch to the appropriate one of USB device drivers 34, 36 or 38 to commence a data transaction in which data is moved between the appropriate USB device 44, 46 or 48 and computer system 10 using a plurality of USB request buffers (URBs), which URBs are a group of addresses in memory 22 allocated by USB control system 28 (shown in FIG. 1 as URBs 74, 76 and 78). In the present example, URB 74 is used for I/O requests between USB device 44 and computer system 10; URB 76 is used for I/O requests between USB device 46 and computer system 10; and URB 78 is used for I/O requests between device 48 and computer system 10.

Figure 2:
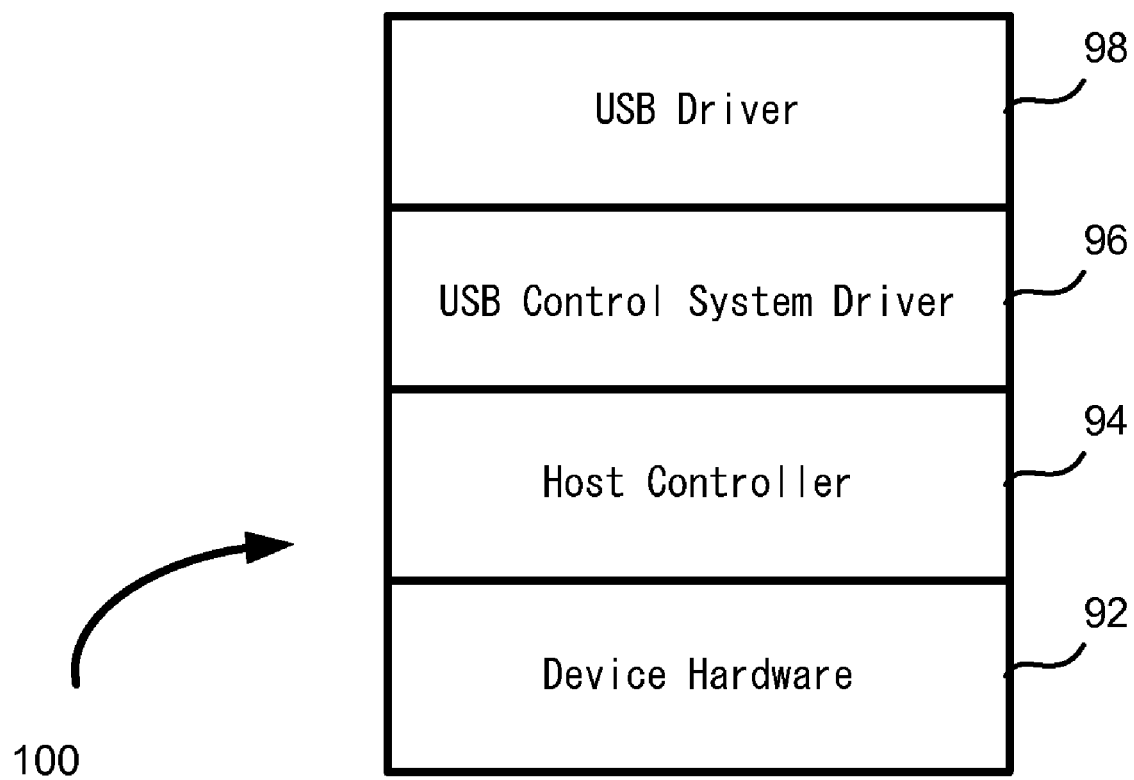
FIG. 2 is a logical representation of a USB stack in accordance with one or more embodiments of the present invention.

Referring to both FIGS. 1 and 2, USB stack 100 is a logical representation of the components of computer system 10 that facilitate communication with USB devices of classes 14, 16 and 18. As shown in FIG. 2, USB stack 100 includes device hardware layer 92, host controller layer 94, host controller driver layer 96 and USB driver layer 98. Device hardware layer 92 corresponds to USB devices 44, 46 and 48 of classes 14, 16 and 18, respectively, and their connections to computer system 10. USB control system 28 (with USB controllers 40 and 42) corresponds to host controller layer 94 and handles physical transmission of data to device layer 92 over USB bus 12. USB control system 28 provides each of USB devices 44, 46 and 48 the capability for a bulk, interrupt, control, and isochronous channel for each direction of transmission in accordance with the desired USB specification. Host controller driver layer 96 manages the operation of USB 12, and USB driver layer 98 manages communication of data between computer system 10 and USB devices of classes 44, 46 and 48.

In the presence of a processing error that terminates normal operation of operating system kernel 60 resulting in a system crash (other than crashes that terminate operation of the processor (for example, stack overflow in real mode on an IA-32 processor—the typical response to those is that the processor shuts down)), it is desirable to store a core dump for, among other things, diagnostic purposes to determine the cause of the crash. It is desirable to store core dump 90 on USB mass storage device 46 after the crash while minimizing, if not avoiding, any processing state changes to computer system 10. To do this, there is a need to move data on USB 12 to generate core dump 90 on USB mass storage device 46 without using interrupts because typically interrupts have been masked in response to the system crash. One or more embodiments of the present invention achieve this by providing kernel 60 with a method to poll for USB control system 28 events (and more particularly, to poll USB controllers 40 and 42) that would generate an interrupt following a system crash if the interrupt were not masked.

In one embodiment a relevant USB host controller is associated with the USB device and is polled specifically after a crash. In another embodiment a USB device detects that processing is occurring after the crash and calls a function to poll all registered PCI devices. In yet another embodiment some USB storage device drivers (e.g., Linux) have a thread which must normally be run to process I/O. Since thread scheduling is not available after the crash, this embodiment short-circuits the driver thread by calling directly to a driver URB dispatch function.

Figure 3:
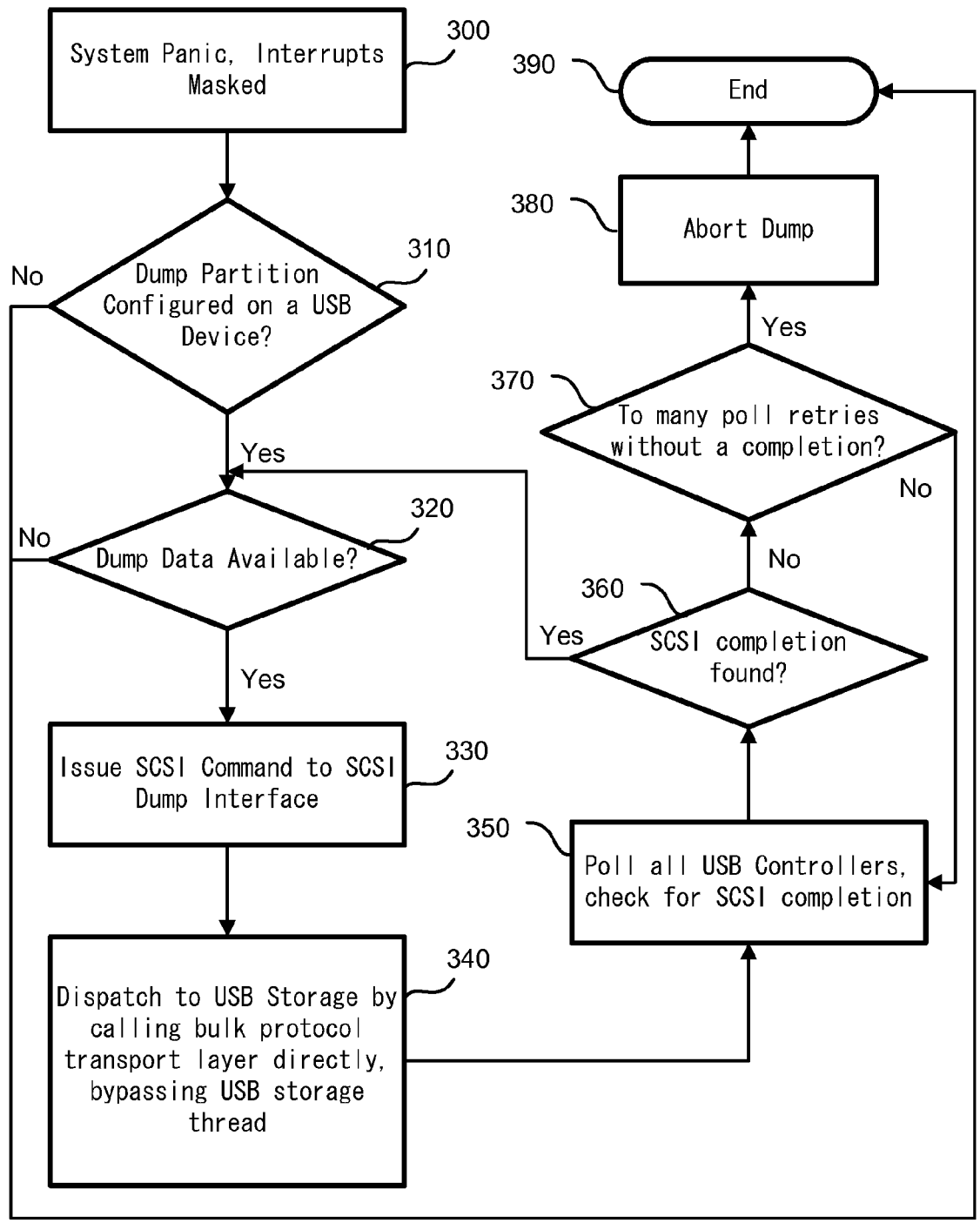
FIG. 3 is a flow diagram showing a method for storing a core dump after a system crash in accordance with one or more embodiments of the present invention.

FIG. 3 is a flow diagram showing a method for storing a core dump after a system crash in accordance with one or more embodiments of the present invention. At step 300 of FIG. 3, kernel 60 detects a system crash in accordance with any one of a number of methods well known to those of ordinary skill in the art, and interrupts are masked. Control is then transferred to decision step 310.

At decision step 310 of FIG. 3, kernel 60 determines whether a dump partition is configured on a USB device (if so, the dump partition is typically registered with kernel 60). If yes, control is transferred to decision step 320, otherwise, control is transferred to step 390 where the method ends.

At decision step 320 of FIG. 3, kernel 60 determines whether dump data (or more dump data) is available. If so, control is transferred to step 330, otherwise, control is transferred to step 390.

At step 330 of FIG. 3, kernel 60 issues a SCSI command to a SCSI dump interface, which, in turn, forwards the command to the appropriate device driver. For example, the command may be forwarded to USB driver 34. Then, control is transferred to step 340.

At step 340 of FIG. 3, the data is dispatched to USB storage by calling a bulk protocol layer directly and bypassing a USB storage thread, for example, USB driver 34 calls USB HCD 30 to transfer data using USB controller 40. Then, control is transferred to step 350.

At step 350 of FIG. 3, kernel 60 polls all USB controllers (for example, USB controller 40) to check for a SCSI completion. Then, control is transferred to decision step 360.

At decision step 360 of FIG. 3, kernel 60 determines whether a SCSI completion was found. If so, control is transferred to decision step 320, otherwise, control is transferred to decision step 370.

At decision step 370 of FIG. 3, kernel 60 determines whether too many poll retries were made without a completion (the determination may be made against a configuration parameter). If so, control is transferred to step 380, otherwise, control is transferred to step 350.

At step 380 of FIG. 3, the core dump is aborted. Then, control is transferred to step 390.

Thus, in accordance with the above-described method, polling of USB controllers to drive a USB storage device after a system crash allows transferring data between kernel 60 and USB mass storage device 46 without using interrupts.

Figure 4:
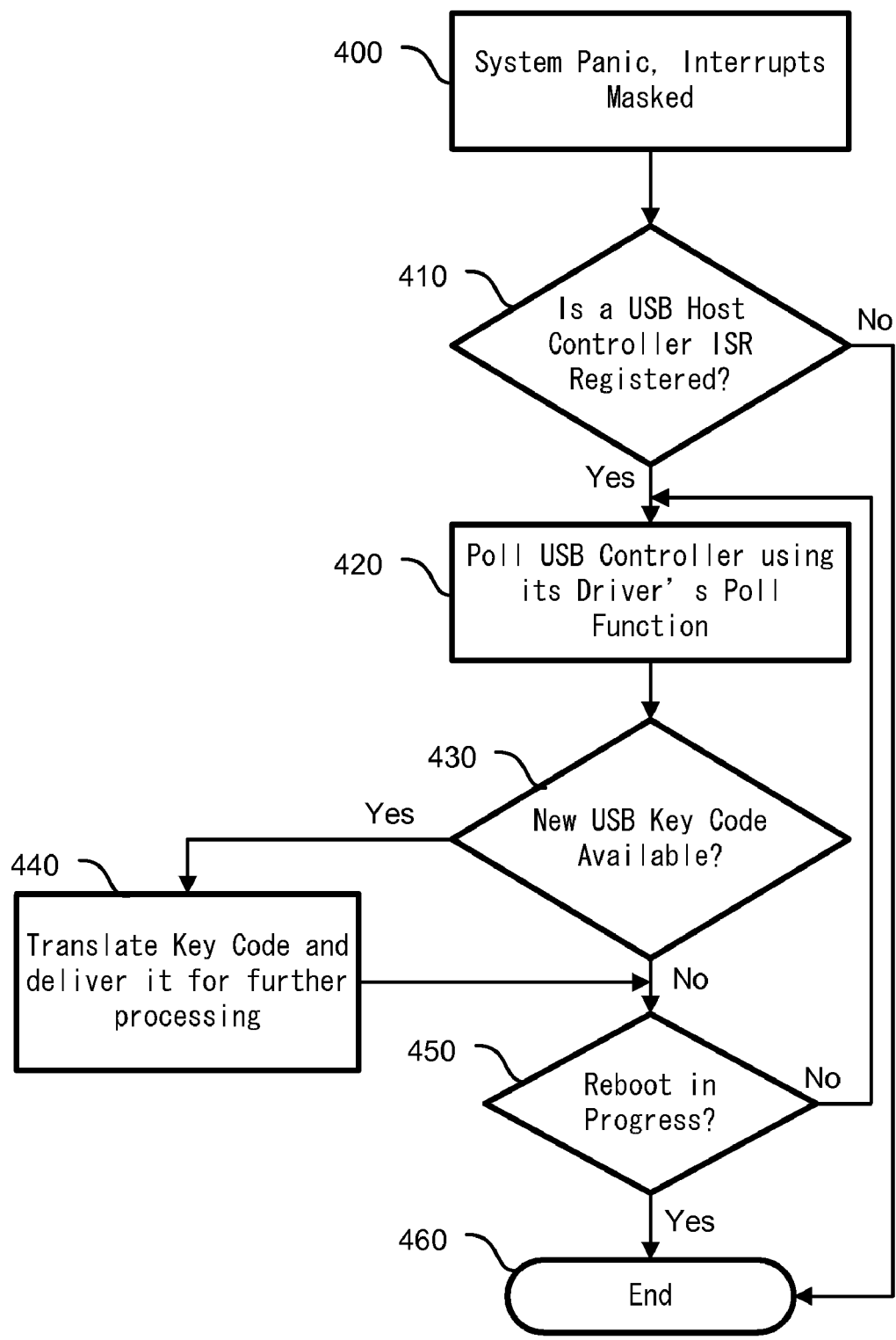
FIG. 4 is a flow diagram showing a method for communicating with a USB device after a system crash in accordance with one or more embodiments of the present invention, for example, to facilitate debugging.

FIG. 4 is a flow diagram showing a method for communicating with a USB device after a system crash in accordance with one or more embodiments of the present invention, for example, to facilitate debugging. At step 400 of FIG. 4, kernel 60 detects a system crash in accordance with any one of a number of methods well known to those of ordinary skill in the art and interrupts are masked. Control is then transferred to decision step 410.

At decision step 410 of FIG. 4, kernel 60 determines whether a USB Host controller's ISR had been registered with the appropriate USB device driver (for example, to determine whether USB controller 40's driver USB HCD 30 registered ISR 50). Note that the ISR will always be registered with the kernel so that control can vector to the ISR when an interrupt is received, but, in accordance with one or more embodiments of the present invention, the ISR is also registered with the USB end device driver so that a device driver which has no ISR can poll. If so, control is transferred to step 420, otherwise, control is transferred to step 460 where the method ends.

At step 420 of FIG. 4, the USB controller (for example, USB controller 40) is polled using its driver's (for example, USB HCD 30) poll function for the registered device. For example, after polling, USB HCD 30 will return a character or 0. Then, control is transferred to decision step 430.

At decision step 430 of FIG. 4, kernel 60 determines whether a new USB key code was received. If so, control is transferred to step 440, otherwise, control is transferred to decision step 450.

At step 440 of FIG. 4, kernel 60 translates the key code and transmits it to other programs for further processing (for example, to a debugger). Then, control is transferred to decision step 450.

At decision step 450, kernel 60 determines whether a reboot is in progress. If so, control is transferred to step 460, otherwise, control is transferred to step 420.

Thus, in accordance with the above-described method, polling for USB keystrokes after a system crash allows transfer of data between kernel 60 and USB keyboard device 44 without using interrupts. This method would be used to determine if USB keyboard device 44 has a keystroke, thereby enabling support for a debugger.

The embodiments of the present invention described above are exemplary. Many changes and modifications may be made to the disclosure recited above, while remaining within the scope of the invention. Additionally, embodiments of the present invention may be implemented in software, firmware or as an abstract of a physical computer system known in the art as a virtual machine or a combination of software, firmware and a virtual machine. With respect to implementing embodiments of the present invention as a virtual machine, an expression of an embodiment the invention may be either as virtual system hardware, guest system software of the virtual machine or a combination thereof. The scope of the invention should, therefore, be limited not to the above description, but instead should be determined with reference to the appended claims along with their full scope of equivalents.

What is claimed is:

1. A method of transferring data from a computer system to a Universal Serial Bus (USB) device, the method comprising:
   detecting a computer crash where interrupts are masked;
   in response to the detecting, transferring at least a portion of data representing a state of the computer system at a time that the crash occurred to a USB driver for the USB device;
   the USB driver transferring the portion of the data to a USB controller driver for a USB controller for the USB device;
   the USB controller driver causing the USB controller to transfer the portion of the data to the USB device;
   polling the USB controller to determine whether the data transfer was completed; and
   if the data transfer was completed, providing a notification to the computer system.

2. The method of claim 1 wherein transferring further includes storing the portion of the data in a core dump partition on the USB device.

3. The method of claim 1 wherein determining includes determining whether data is present in a USB request buffer associated with the USB driver.

4. The method of claim 1 which further includes continuously transferring until all data has been transferred to the USB driver.

5. A method of transferring data from a Universal Serial Bus (USB) device to a computer system, the method comprising:
   detecting a computer crash where interrupts are masked;
   in response to the detecting, identifying a USB device used to communicate data representing a state of the computer system at a time that the crash occurred to the computer system;
   polling a USB controller for the identified USB device to determine whether new input has been received;
   if so, obtaining the new input; and
   transferring the new input to the computer system for further processing.

6. A computer readable medium, that is non-transitory, having instructions stored thereon that, when executed by one or more processors, cause the one or more processors to carry out a method of transferring data from a computer system to a Universal Serial Bus (USB) device, the method comprising:
   detecting a computer crash where interrupts are masked;
   in response to the detecting, transferring at least a portion of the data representing a state of the computer system at a time that the crash occurred to a USB driver for the USB device;
   the USB driver transferring the portion of the data to a USB controller driver for a USB controller for the USB device;
   the USB controller driver causing the USB controller to transfer the portion of the data to the USB device;
   polling the USB controller to determine whether the data transfer was completed; and
   if the data transfer was completed, providing a notification to the computer system.

7. The computer readable medium of claim 6 wherein transferring further includes storing the portion of the data in a core dump partition on the USB device.

8. The computer readable medium of claim 6 wherein determining includes determining whether data is present in a USB request buffer associated with the USB driver.

9. The computer readable medium of claim 6 wherein the method further includes continuously transferring until all data has been transferred to the USB driver.

10. The computer readable medium of claim 6,
polling the USB controller for the USB device to determine whether new input has been received;
if so, obtaining the new input; and
transferring the new input to the computer system for further processing.

11. A computer system including a processor, memory, and a Universal Serial Bus (USB) controller, which computer system interacts through the USB controller with a USB device; and which computer system includes software modules to carry out a method which comprises:
detecting a computer system crash where interrupts are masked;
in response to the detecting, transferring at least a portion of data representing a state of the computer system at a time that the crash occurred to a USB driver for the USB device;
the USB driver transferring the portion of the data to a USB controller driver for the USB controller;
the USB controller driver causing the USB controller to transfer the portion of the data to the USB device;
polling the USB controller to determine whether the data transfer was completed; and if the data transfer was completed, providing a notification to the computer system.

12. The computer system of claim 11, wherein the method further comprises:
polling the USB controller for the USB device to determine whether new input has been received;
if so, obtaining the new input; and
transferring the new input to the computer system for further processing.

* * * * *